July 4, 1961 T. J. SCHULZE 2,991,427

SATURABLE MAGNETIC MULTIVIBRATOR

Filed Sept. 16, 1957 2 Sheets-Sheet 1

INVENTOR.
THEODORE J. SCHULZE

BY Louis J. Knobbe

AGENT

July 4, 1961 T. J. SCHULZE 2,991,427

SATURABLE MAGNETIC MULTIVIBRATOR

Filed Sept. 16, 1957 2 Sheets-Sheet 2

INVENTOR.
THEODORE J. SCHULZE
BY Louis J. Knobbe
AGENT 2,991,427
SATURABLE MAGNETIC MULTIVIBRATOR
Theodore J. Schulze, Hinsdale, Ill., assignor to North American Aviation, Inc.
Filed Sept. 16, 1957, Ser. No. 684,298
10 Claims. (Cl. 331—56)

This invention relates to multivibrators and particularly to those using saturable magnetic elements.

Saturable magnetic multivibrators have often heretofore employed a voltage feedback from the load circuit for providing the multivibrator action. In such multivibrators, operating characteristics of the multivibrator are dependent upon the load characteristics. Thus, a load having changing characteristics, for example, a changing impedance load, affects the multivibrator operation. Also, it is often desired to operate the saturable magnetic device at an impedance level differing substantially from the impedance level of the load, without employing additional components external to the saturable magnetic elements to change the impedance levels at which the device operates.

The present invention employs a voltage feedback from the cores of the saturable magnetic elements. The operating characteristics and impedance levels are therefore independent of the load characteristics.

It is, accordingly, an object of this invention to provide an improved saturable magnetic multivibrator.

It is another object of this invention to provide a saturable magnetic multivibrator having operating characteristics independent of the load.

It is still another object of this invention to provide a magnetic multivibrator having an impedance level determined by the impedance level of the saturable magnetic elements.

A further object of this invention is to provide a magnetic multivibrator in which the control circuit impedance is independent of the load circuit impedance.

It is another object of this invention to provide a saturable magnetic multivibrator capable of very low frequency operation.

It is still another object of this invention to provide a saturable magnetic multivibrator in which positive feedback is obtained during periods that the saturable elements are in a reset condition.

A further object of this invention is to provide a magnetic multivibrator capable of delivering several watts of power to a load or pair of loads connected thereto.

Briefly, in accordance with a preferred form of the present invention, a saturable magnetic multivibrator includes a pair of saturable magnetic elements. Each of the saturable magnetic elements is provided not only with the customary load and control circuits, but also with a feedback circuit. A positive voltage feedback obtained from this feedback circuit maintains one of the saturable magnetic elements in a reset condition for a period determined by a suitable energy storage element or by an external triggering source, after which the other of said saturable devices is caused to reset. Load circuits connected to the saturable elements in a customary fashion are energized during periods that the saturable elements are saturated.

A more thorough understanding of the invention may be obtained by a study of the following detailed description taken in connection with the accompanying drawings, in which.

Figure 1:
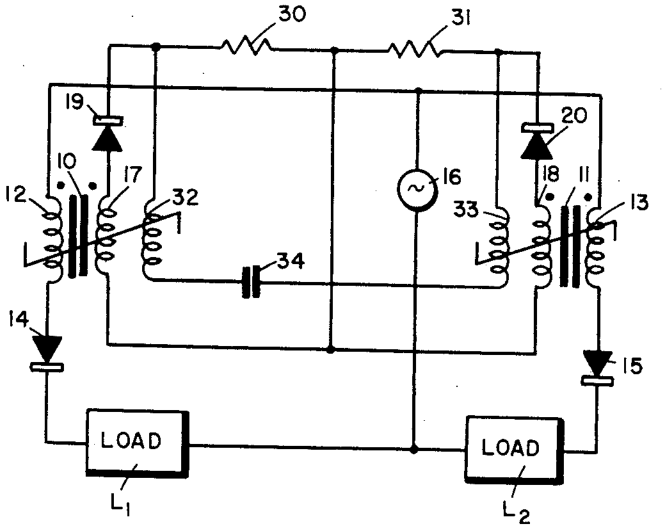
FIG. 1 illustrates schematically a half wave free-running embodiment of the invention.

Referring now to FIG. 1, saturable reactor 10 has load winding 12 connected in series with a rectifier 14, a load $L_1$, and an alternating-current power source 16. A second saturable reactor 11 has a load winding 13 in series with a rectifier 15, a load $L_2$ and the alternating-current power source 16. Saturable reactors 10 and 11 have magnetic states of saturation (positive or negative) and unsaturation, the latter also being termed a reset condition. The cores of these reactors are preferably constructed from core materials exhibiting a substantially square hysteresis loop. Alternating-current power source 16 is of sufficient amplitude to saturate the cores of reactors 10 and 11 during periods of half wave conduction through rectifiers 14 and 15. Feedback windings 17 and 18 located respectively on saturable reactors 10 and 11 are connected in series, and respectively to series connected rectifiers 19 and 20 and resistors 30 and 31. A control circuit includes control windings 32 and 33 located respectively on saturable reactors 10 and 11. The control windings are connected to opposite plates of a capacitor 34 and also across series connected resistors 30 and 31. A common connection between the midpoint connections of feedback windings 17 and 18 and resistors 30 and 31 completes the multivibrator circuit.

The operation of the free-running multivibrator shown in FIG. 1 is as follows: Assuming saturable reactor 10 in a reset unsaturated state, and saturable reactor 11 in a saturated state, a voltage input in the proper direction from alternating-current power source 16 will cause rectifier 14 to conduct thereby permitting current to flow in load winding 12. This current will be very small in relation to that required to drive the load $L_1$. This is because for core materials exhibiting a square or nearly square hysteresis loop, large increases in voltage are required to produce a small increase in current during an unsaturated period. Thus, the impedance presented by the load winding 12 may be relatively large during such unsaturated periods. Before the saturation level of the core is reached, a transformer action will be obtained in reactor 10 with magnetic flux linking load winding 12 with feedback winding 17. As indicated by the dot convention, a current flowing through load winding 12 and rectifier 14 will cause a current to flow in feedback winding 17 thereby causing rectifier 19 to conduct. The voltage feedback appearing across feedback winding 17 will effect a voltage build up across resistor 30, this latter voltage in turn causing capacitor 34 to charge. Rectifier 19 permits only a unidirectional charging voltage to be applied to capacitor 34. Control winding 32 is suitably wound in reactor 10 so that the unidirectional current flowing through winding 32 to charge capacitor 34 also maintains reactor 10 in a reset unsaturated state. As long as the charging current flows, saturable reactor 10 remains in the reset state and the transformer action between load winding 12 and feedback winding 17 is maintained. However, after an interval determined by the time constant of the control circuit (which may include several cycles of the voltage from source 16), the capacitor 34 will be fully charged and current will cease to flow through control winding 32. Since power source 16 is of sufficient magnitude to saturate the core of saturable reactor 10 in its unreset state, the rate of change of magnetic flux in reactor 10 will increase only until the core saturates at which time additional current flow through load winding 12 produces substantially no increase in magnetic flux. Because of the lack of any increase in flux in the core, no voltage will be induced in either the load or feedback winding 12 and 17.

The capacitor 34 will then discharge through control winding 33 wound on reactor 11 with the result that the discharge current resets the previously saturated reactor 11. Transformer action will then be permitted between load winding 13 and feedback winding 18 in the manner of operation of reactor 10 as heretofore described. The voltage across resistor 31 due to the voltage feedback across feedback winding 18 will cause capacitor 34 to charge in an opposite direction. Rectifier 20 serving a function analogous to that of rectifier 19 permits only a unidirectional charging voltage to be applied to capacitor 34. The charging current for this period flows through control winding 33 thereby maintaining reactor 11 in a reset condition until capacitor 34 is substantially charged whereupon the charging current is reduced to a value insufficient to reset reactor 11. Capacitor 34 then discharges through control winding 32 so as to reset the previously saturated reactor 10.

It will thus be seen that the device shown in FIG. 1 operates as a free-running multivibrator, flipping by itself from one reactor to another at predetermined intervals. The magnetic states of saturation and reset serve as bistable states for the multivibrator's saturable reactors. The feedback path interconnects the saturable reactors so that they may properly be described as having mutually exclusive bistable states, i.e., when reactor 10 is in a stable state of reset, reactor 11 is in a stable state of saturation and conversely reactor 10 is in a stable state of saturation when reactor 11 is in a stable state of reset.

Loads $L_1$ and $L_2$ are connected to reactors 10 and 11 to receive half wave power during periods that load windings 12 and 13 respectively are saturated. In a saturation condition substantially no change in flux occurs with the result that no voltage is induced in the respective load winding. Since impedance is represented by the ratio between the voltage and the current, the load windings therefore have substantially zero impedance when their associated core becomes saturated. Thus, a low impedance alternately connects alternating power source 16 with loads $L_1$ and $L_2$. Although this invention is particularly adapted to operating a device having a dual load requiring power to alternately and periodically be delivered to the loads, either of the loads $L_1$ or $L_2$ may be used singularly with the other of the loads acting merely as a dummy load.

An important advantage of this invention is that the loads are independent of the multivibrator feedback circuitry. A voltage is fed back in a saturable reactor when it is in a reset condition, or stated in another way, the core has maximum voltage impressed on it when its associated load has none. This condition is of course opposite to the operation of circuits in which feedback from the load is utilized. Loads $L_1$ and $L_2$ therefore may have any degree of unbalance or any value of reactance without affecting the multivibrator action. The only exception is that the loads cannot be of infinite resistance since this would prevent a flow of current through the load windings thereby preventing any flow of feedback current for resetting the cores.

A significant corollary is that of providing a single load in which the direct current voltage reverses as the saturable reactors change states. In Patent 2,764,726, entitled "Reversible Polarities Direct-Current Output Magnetic Amplifier Requiring Only One Alternating Current Source," issued September 25, 1956, to K. L. Sanders, Jr., and assigned to North American Aviation, Inc., assignee of the present invention, is disclosed circuitry for achieving this result. Following the teachings of the Sanders' patent, it is necessary only to substitute a pair of load windings for each of the load windings 12 and 13, and connect the load winding pairs with a single load and additional rectifying elements.

Another important advantage derived from isolating the load and feedback circuitry is that the operating impedance of the multivibrator may be fixed at a desired level independent of the particular value of the load impedance. This is especially desirable when the load is of a relatively low impedance since a multivibrator in which feedback is obtained directly from the load would consequently require a low impedance level in the magnetic circuitry. This necessitates windings of large wire and a large value of capacitance for capacitor 34. Normally a low impedance level would also necessitate using large currents and associated low voltages. The aforementioned design considerations are usually not those which would be incorporated if the designer had a free hand. For example, it is usually advantageous to manufacture the windings of the magnetic device from wire of relatively small diameter. Also, if a capacitor of smaller value is utilized, a paper capacitor may be substituted for an electrolytic one thereby representing a cost savings. Furthermore, oftentimes it is desired to utilize higher voltage and lower current levels than would be available if the impedance level were determined by the load characteristics. In this invention the impedance level may be set at any desired level by the designer. In the application described hereinafter with loads of low impedance, it has been found desirable to operate the device at an impedance level above that of the loads thereby permitting wire of smaller diameter to be utilized in the reactor windings and also permitting a paper capacitor to be utilized instead of an electrolytic one.

The multivibrator herein described also has the desirable characteristic of operating at a frequency which is substantially unaffected by the values or impedance characteristics of the loads. The frequency at which the device operates is determined by the time constant of the control circuit and the electric characteristics of the cores embodied in the saturable reactors.

Figure 2:
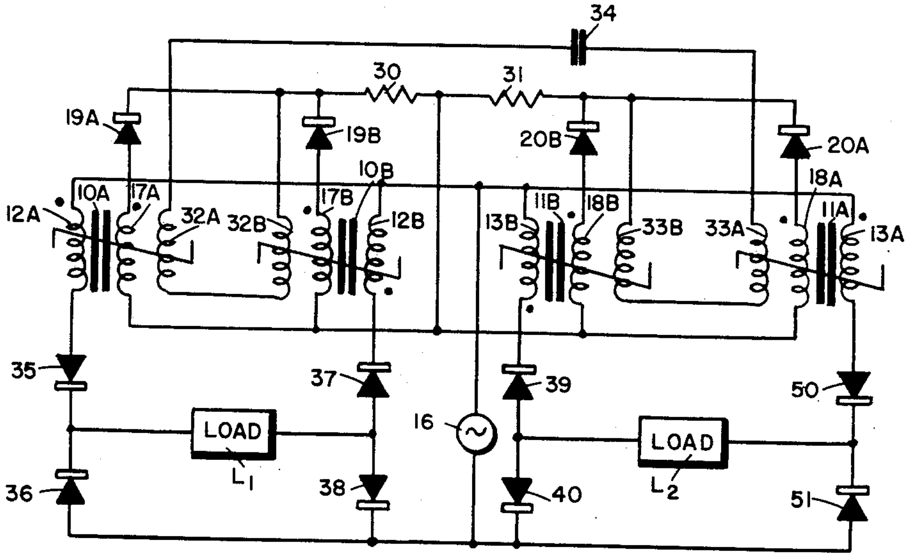
FIG. 2 is a circuit diagram of a full wave free-running embodiment of the invention.

In FIG. 2 is shown a full wave embodiment of the saturable magnetic multivibrator illustrated in FIG. 1 and described above. Saturable reactors 10A and 10B have respectively load windings 12A and 12B. Rectifiers 35, 36, 37 and 38 are so connected that opposite half cycles of A.C. power flow alternately through load windings 12A and 12B. A similar connection is provided for load $L_2$ by rectifiers 39, 40, 50 and 51 in combination with load windings 13A and 13B of saturable reactors 11A and 11B. Alternating-current power source is connected as in FIG. 1 to energize the loads $L_1$ and $L_2$ through the saturable magnetic circuitry. It will be apparent that the aforementioned circuitry forms a pair of bridge circuits connected so as to deliver full wave power to loads $L_1$ and $L_2$ whenever the respective load windings constitute a low impedance path for the power from source 16. Saturable reactors 10A, 10B, 11A and 11B have respectively feedback windings 17A, 17B, 18A and 18B and control windings 32A, 32B, 33A and 33B.

The operation of this full wave embodiment is identical to that of the single wave embodiment with, of course, the exception that full wave power is delivered to the loads. As denoted by the dot convention, full wave current flows in resistor 30 or 31 as a result of voltage feedback in the reactor pair 10A, 10B or reactor pair 11A, 11B. Capacitor 34 is connected as in the previous circuit so as to be charged as a result of voltage buildup across either resistor 30 or 31. At such time as this capacitor is substantially charged, current in the control windings of the reset reactor will cease and the reactor will go into a saturation condition. The capacitor 34 then discharges through control windings of the other of said pair of reactors so that these previously saturated reactors will be reset. A similar cycle of operation will then occur thereby providing the free-running multivibrator action.

By way of illustration only, the following specific values are given as typical of those which may be used in the embodiment of the invention illustrated in FIG. 2.

| | |
|---|---|
| Load windings **12*a*, 12*b*, 13*a*,** and **13*b*** | 1900 turns of No. 28 wire. |
| Alternating power source **16** | 115 volt R.M.S. at 400 c.p.s. |
| Feedback windings **17*a*, 17*b*, 18*a*,** and **18*b*** | 1800 turns of No. 40 wire. |

| | |
|---|---|
| Rectifiers **19***a*, **19***b*, **20***a*, and **20***b* | Type V5CP selenium rectifier manufactured by the Int'l. Rectifier Corp. |
| Resistors **30** and **31** | 16,000 ohms. |
| Control windings **32***a*, **32***b*, **33***a*, and **33***b* | 1200 turns of No. 40 wire. |
| Capacitor **34** | 1.5 microfarads. |
| Rectifiers **35**, **36**, **37**, **38**, **39**, **40**, **50** and **51** | Type B3DINREM selenium rectifier manufactured by the Int'l. Rectifier Corp. |
| $L_1$ and $L_2$ | 175 ohms. |

The reactor cores 10*a*, 10*b*, 11*a*, and 11*b* were manufactured from Deltamax, a product of the Arnold Engineering Company and sold under the number 4635. This material is 50% nickel and 50% iron and has a substantially square hysteresis loop. The cores were constructed as toroids having rectangular cross sections, the dimensions being 1.375 inches and 1.00 inch for the outside and inside diameters respectively. The width of the rectangular cross section was 0.25 inch. With these circuit elements, the illustrated multivibrator delivered 16 watts of power to the loads at a frequency of 10 cycles per second.

In the previous discussion of the operation of the multivibrator it has been assumed that one of the reactors or reactor pairs was in a reset state while the other of said reactors was in a saturated state. This condition is met when the cores have been operated in the saturable magnetic circuitry because of the residual flux retained by the cores. However, when the circuit is initially connected, both of said cores or core pairs may be in a state of zero residual flux. Even then the circuit will possibly start because of minor differences in the cores. However, if the cores are matched and in a state of zero residual flux, it will be necessary to initially magnetize one of the cores before the circuit will operate.

Figure 3:
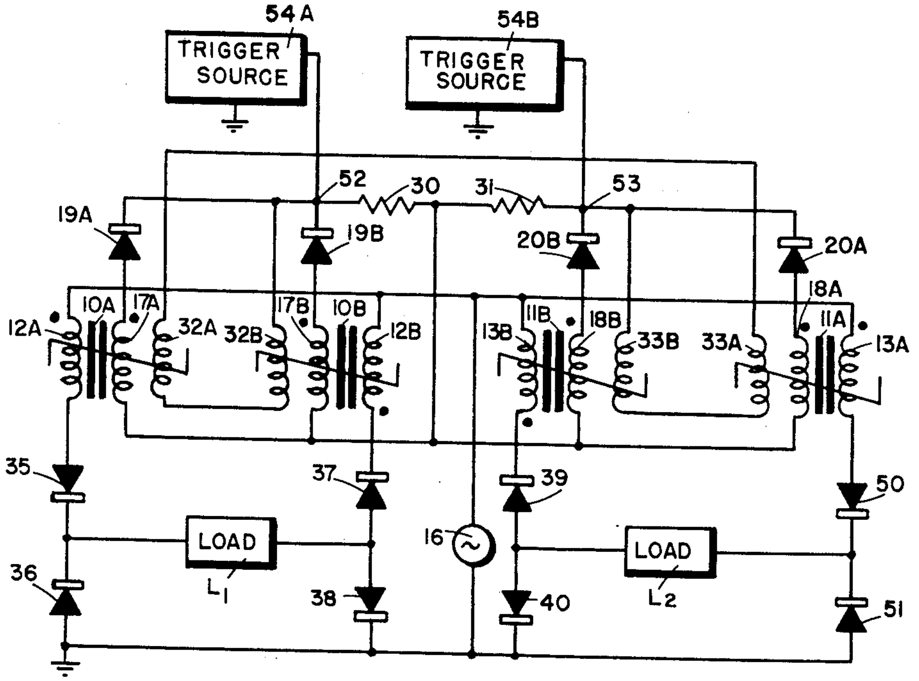
FIG. 3 is a schematic diagram of a full wave bistable embodiment of the invention.

The circuit shown in FIG. 3 is a full wave bistable embodiment of the invention. It will be obvious that this circuit is identical in most respects to that of the full wave free-running embodiment illustrated in FIG. 2 with the exception that the capacitor 34 is deleted and trigger sources 54*a* and 54*b* are connected to resistors 30 and 31 at points 52 and 53. Different methods of triggering multivibrator circuits are well known in the art and are also applicable to the magnetic multivibrator herein described. In this bistable embodiment a reactor pair in a reset condition will remain so because of a continuous voltage feedback resulting in a resetting current through the respective control windings. It will be noted that the saturated pair are also sustained in a stable state because of the direction of current flow through their control windings. However, a saturating pulse from a suitable triggering source applied to the reset reactor or a resetting pulse applied to the saturated reactor will cause a reversal of states to occur thereby providing a bistable device.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A saturable magnetic multivibrator comprising a pair of saturable magnetic elements having two stable magnetic states, a load circuit coupled to each of said magnetic elements, a power source coupled to said load circuit and adapted to generate magnetic flux in said magnetic elements to place each of said magnetic elements in one of said stable magnetic states, a control circuit coupled to each of said magnetic elements and adapted to generate magnetic flux therein to place each of said magnetic elements in the other of said stable magnetic states, a feedback circuit independent of said load circuit and coupled to each of said magnetic elements so that the magnetic flux generated in said magnetic elements by said power source links the associated feedback circuit and causes a feedback voltage therein, said feedback means including a feedback winding coupled to each of said magnetic elements and unidirectional current means for coupling each said feedback winding and its associated control circuit so that said feedback voltages maintain said magnetic elements in mutually exclusive stable magnetic states.

2. A multivibrator comprising two saturable means, said saturable means connected to have mutually exclusive bistable states comprising a reset state and a saturation state, a load circuit including a power source coupled to each of said saturable means and adapted to generate magnetic flux therein for saturating each of said saturable means, control means coupled to said saturable means and adapted for generating magnetic flux therein to reset each of said saturable means, and feedback means independent of said load circuit and coupled to each of said saturable means so that the magnetic flux generated in each said saturable means by said load circuit links the associated feedback circuit and causes a feedback voltage therein, said feedback means including a feedback winding coupled to each of said saturable means and unidirectional current means for coupling each of said feedback windings and its associated control means so that said feedback voltages maintain the associated saturable means in a reset state.

3. In combination, two saturable reactors each having a core, a load winding, a control winding, and a feedback winding, an output circuit including a load in circuit with each of said load windings, and reset means independent of said output circuit and interconnecting said feedback windings and said control windings for resetting said saturable reactors.

4. A multivibrator comprising two saturable reactors each having coupled thereto a core, a load winding, a control winding, and a feedback winding, said cores having a pair of bistable states comprising a reset state and a saturation state, a load and power source in circuit with each of said load windings for generating magnetic flux in said cores, and a unidirectional feedback path independent of said output circuit connected to said feedback windings so that unidirectional feedback voltages are obtained when magnetic flux is generated in said cores by said power source, said unidirectional path comprising unidirectional current means connecting said feedback voltages from said feedback windings to said control windings so that magnetic flux is generated in said cores for maintaining said saturable reactors in mutually exclusive states.

5. A free-running multivibrator comprising two saturable means having bistable states comprising reset and saturated states, a load circuit including a power source adapted to saturate each of said saturable means, control means adapted to reset each of said saturable means, feedback means independent of said load circuit and interconnecting said saturable means and said control means for maintaining said saturable means in mutually exclusive states, and means coupled to said feedback means adapted for storing a predetermined amount of energy, said storage means being charged by voltage feedback from whichever of said saturable means is in a reset condition, said charging condition influencing the control means of said reset saturable means so as to sustain said reset condition until said storage means has stored a predetermined amount of energy whereupon a reversal of states occurs.

6. A free-running multivibrator comprising a pair of alternately reset saturable reactors each having a core, a load winding, a control winding, and a feedback winding, a load and alternating power source in circuit with each of said load windings and adapted to saturate said cores, an energy storage element adapted to store a predetermined amount of energy coupled to said feedback windings and said control windings, said energy storage element being charged by voltage feedback from the feedback winding associated with the reset reactor, said charging condition influencing the control winding associated with the reset reactor thereby sustaining said reset condition until said storage means has stored a predetermined amount of energy whereupon said storage means discharges and influences the control winding associated with the saturated reactor causing said saturated reactor to become reset.

7. A free-running multivibrator comprising a pair of alternately reset saturable reactors each having a core, a load winding, a control winding, and a feedback winding, a load and alternating power source in circuit with each of said load windings and adapted to saturate said cores, an energy storage element adapted to store a predetermined amount of energy coupled to said feedback windings and said control windings, a feedback circuit including rectifier means in combination with said feedback windings, said energy storage element being charged by voltage feedback from the feedback winding associated with the reset reactor, said charging condition influencing the control winding associated with the reset reactor thereby sustaining said reset condition until said storage means has stored a predetermined amount of energy whereupon said storage means discharges and influences the control winding associated with the saturated reactor causing said saturated reactor to become reset.

8. A free-running multivibrator comprising two pair of saturable reactors each having a core, a load winding, a control winding and a feedback winding, a load in circuit with each pair of load windings, an alternating power source and first rectifier means in circuit with and adapted for delivering full wave power to said load, first series circuits including second rectifier means in series with each feedback winding, an energy storage means including resistance and capacitive elements coupled to said first series circuits and adapted for storing energy when said feedback windings are energized, second series circuits including said control windings, and a current path connecting said second series circuit with said energy storage means.

9. A free-running multivibrator comprising two pair of saturable reactors each having a core, a load winding, a control winding, and a feedback winding; a pair of bridge circuits, two arms of each bridge circuit including a first rectifier means connected in series with one of a pair of said load windings; the remaining two arms of each of said bridge circuits including a second rectifier means; said bridge circuits energized by a source of alternating power connected thereto; load means connected to said bridge circuits, said first and second rectifier means connected so as to deliver full wave power to said load; first series circuits including third rectifier means in series with each feedback winding, a pair of said first series circuits associated with a pair of saturable reactors being connected in parallel; a resistor connected in parallel with each of said parallel-connected first series circuits; a second series circuit including said resistors; a third series circuit including the control windings associated with one of said pairs of saturable reactors, a fourth series circuit including the control windings associated with the other of said pairs of saturable reactors; a capacitor; and a fifth series circuit including said capacitor, said second series circuit, said third series circuit, and said fourth series circuit.

10. A bistable device comprising at least a pair of saturable means each having two magnetic states, a load circuit including a power source and load winding coupled to each of said saturable means, said load circuit being adapted to generate magnetic flux therein for respectively saturating each of said saturable means, control means including control windings coupled to each of said saturable means for generating magnetic flux in the associated saturable means, separate feedback means independent of said load circuit for providing a reset current for each of said saturable means, each of said feedback means including a feedback winding coupled to each of said saturable means and unidirectional current means for coupling each of said feedback windings to its associated control winding, and means coupled to said control means for applying trigger pulses to said saturable means for initiating a reversal of states.

References Cited in the file of this patent

UNITED STATES PATENTS

| | | |
|---|---|---|
| 2,591,406 | Carter et al. | Apr. 1, 1952 |
| 2,801,345 | Eckert et al. | July 30, 1957 |
| 2,827,570 | Lynn | Mar. 18, 1958 |

OTHER REFERENCES

"Transductors With Four-Limbed Cores" (A. G. Milnes), published by Proceedings of the Institution of Electrical Engineers (October 1954), vol. 101, part II, No. 83; page 557 relied on.